March 3, 1970     M. V. FRIEDELL     3,498,583
COMPOUND MOVEMENT BUTTERFLY VALVE
Filed Oct. 7, 1966     4 Sheets-Sheet 1

INVENTOR.
Morley V. Friedell
BY Van Valkenburgh & Force
ATTORNEYS

INVENTOR.
Morley V. Friedell

ATTORNEYS

March 3, 1970 M. V. FRIEDELL 3,498,583
COMPOUND MOVEMENT BUTTERFLY VALVE
Filed Oct. 7, 1966 4 Sheets-Sheet 3
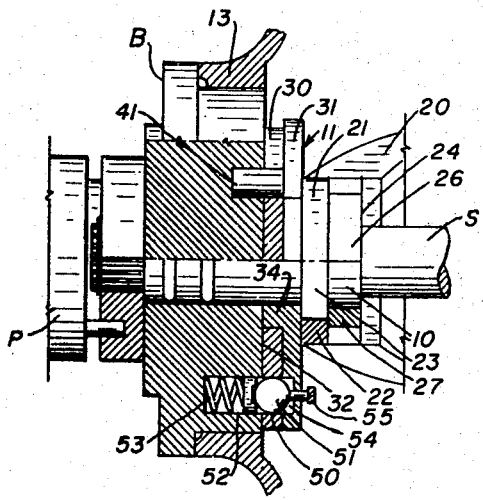
Fig. 6
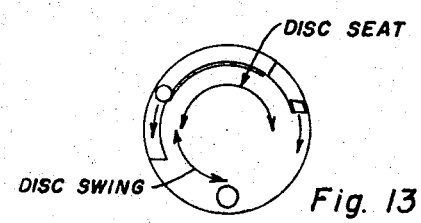
Fig. 13
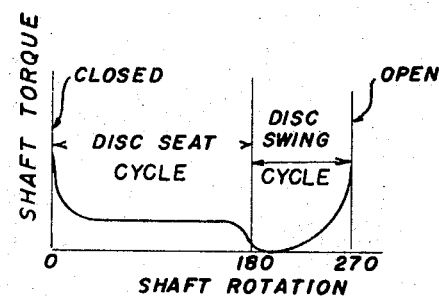
Fig. 14
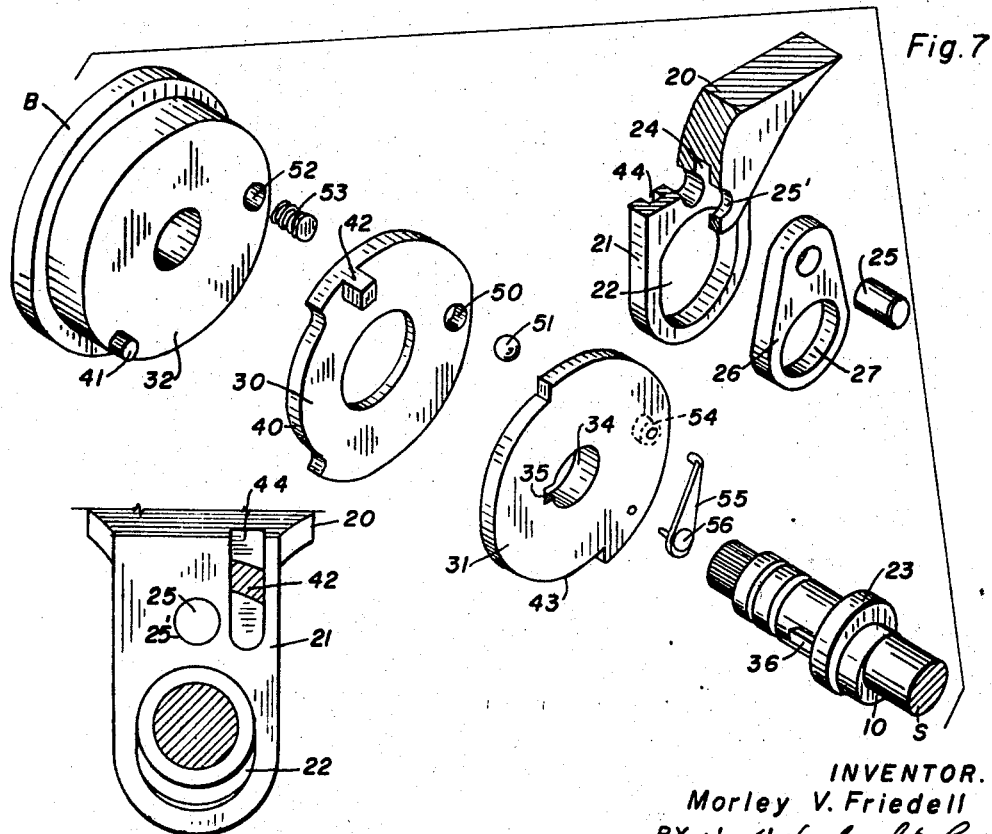
Fig. 7
Fig. 8
INVENTOR.
Morley V. Friedell
BY
ATTORNEYS March 3, 1970 M. V. FRIEDELL 3,498,583
COMPOUND MOVEMENT BUTTERFLY VALVE
Filed Oct. 7, 1966 4 Sheets-Sheet 4

INVENTOR.
Morley V. Friedell
BY
ATTORNEYS

United States Patent Office 3,498,583
Patented Mar. 3, 1970

3,498,583
COMPOUND MOVEMENT BUTTERFLY VALVE
Morley V. Friedell, Wheatridge, Colo., assignor to Martin-Marietta Corporation, New York, N.Y., a corporation of Maryland
Filed Oct. 7, 1966, Ser. No. 585,507
Int. Cl. F16k 25/00, 1/22
U.S. Cl. 251—162                                8 Claims

ABSTRACT OF THE DISCLOSURE

The valve comprises a compound movement butterfly-type valve member which is rotated to move between an open position, wherein the disc-shaped valve member is disposed parallel to the flow and a flow-traversing position wherein the disc is disposed transversely to the flow. The valve member also moves from the flow-traversing position to a closed position by translating into engagement with a seat to block flow through the valve. The valve is moved between these positions by a shaft carrying a pair of cooperating plates and cam means. One of the plates is fixed to the shaft and the plates are selectively interconnected by a ball-type clutch to provide for rotation of the valve member. The other plate is connected by the clutch to a stationary member to fix the valve member against rotation during which the cam means can affect translation of the valve member.

This invention relates to valves, and more particularly to compound-movement butterfly valves, the type sometimes called hybrid butterfly-poppet valves. Such a valve includes a closure disc mounted upon a support shaft within a ring-like body. The disc will swing upon the shaft as from an open position where it lies essentially parallel to the flow axis of the body and conduit wherein the valve is mounted, to a flow-traversing position with the closure disc then being normal to the flow axis and substantially interrupting and cutting off the flow through the valve. Subsequently, the disc will shift in the direction of the flow axis to a ring seat in the valve body for a complete closure. The invention, an improved compound-movement butterfly valve described herein, will sometimes be called a "butterfly valve" or simply a "valve."

An object of the invention is to provide a novel and improved compound-movement butterfly valve which operates by rotation of the support shaft to both swing and shift the closure disc in distinct sequential cycles of movement, for example, first swinging the closure disc from the open position to a flow-traversing position and subsequently shifting the disc from the flow-traversing position to a final seated closed position.

Another object of the invention is to provide a novel and improved compound-movement butterfly valve, where the cycles of swinging and shifting movements of the closure disc are effected by a rotation of the supporting shaft of the valve in a manner which is especially suitable for connecting a motorized drive to the shaft and is also easily adapted to be rotated as by a lever or cranking attachment.

Another object of the invention is to provide a novel and improved compound-movement butterfly valve wherein the closure disc is mounted upon its support shaft in a manner which minimizes the shaft torque required to open and close the valve, avoids slam-shut action when the valve is being closed under unbalanced pressure, and also permits the valve to be easily openend and closed as desired.

Another object of the invention is to provide a compound-movement butterfly valve operable through the sequential cycles of swinging and shifting a closure disc by continuous rotation of the support shaft which includes a novel and improved interlock arrangement of controls adapted to provide a mechanical advantage between the rotation of the shaft and movement of the disc to minimize the shaft torque during the shifting cycle of operation when unbalanced forces on the disc are a maximum.

Another object of the invention is to provide, in a compound-movement butterfly valve, a novel and improved interlock control between the shaft and closure disc which is effective to lock the disc to the shaft whenever the shaft is turning to swing the disc as from an open to a flow-traversing position and is effective to hold the disc in such flow traversing position whenever the shaft is turning to shift the disc to a seated position.

Other objects of the invention are to provide a novel and improved compound-movement butterfly valve which: (a) can be designed to operate easily to open or close against substantial hydraulic pressures, (b) may be closed and tightly seated in a gradual manner to minimize the tendency of water hammer surges and shocks to occur, and (c) is a surprisingly efficient light-weight, compact, low-cost, rugged and durable structure.

With the foregoing and other objects in view, all of which more fully hereinafter appear, my invention comprises certain constructions, combinations, and arrangements of parts and elements as hereinafter described, defined in the appended claims and illustrated in the accompanying drawing, in which:

FIGURE 6 is a sectional view of the disc control mechanism as taken from the indicated line 6—6 at FIG. 5.

FIGURE 7 is an isometric exploded view of the components forming the disc control mechanism, the showing being as taken substantially from the indicated arrow 7 at FIG. 6.

FIGURE 8 is a fragmentary sectional detail as taken from the indicated line 8—8 at FIG. 1 but on an enlarged scale.

FIGURE 13 is a diagrammatic view of portions of the disc control mechanism to illustrate the same as being in the flow-traversing, unseated position as at FIG. 5 and with arc arrows indicating the shaft rotation in a clockwise direction for seating the valve and in a counterclockwise direction for opening the valve.

FIGURE 14 is a representative diagram illustrating the variation of shaft torque as the disc rotates from a seated to an open position.

Figure 2:
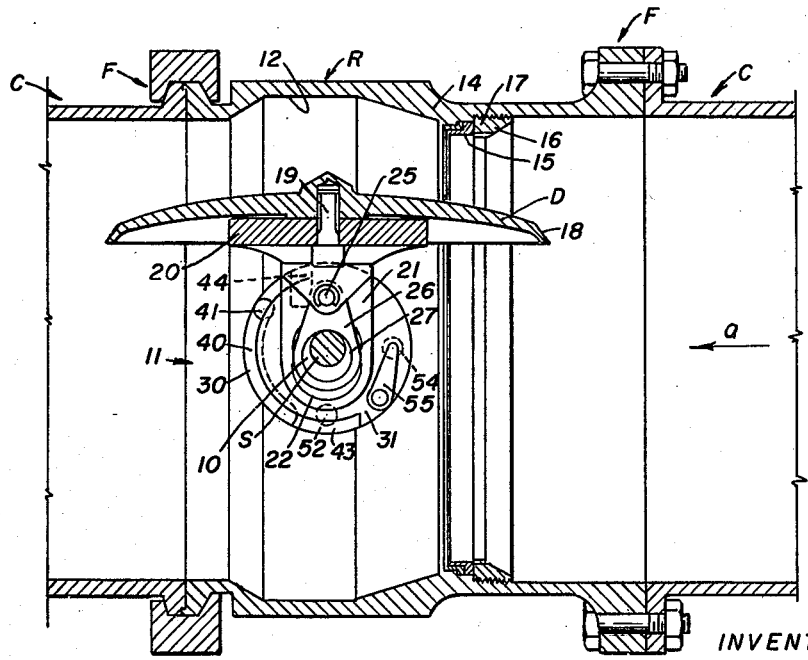
FIGURE 2 is a longitudinal sectional view of the valve as taken from the indicated line 2—2 at FIG. 1 but with portions of a conduit being connected to the ends of the valve illustrative of a typical installation in a line.
Figure 3:
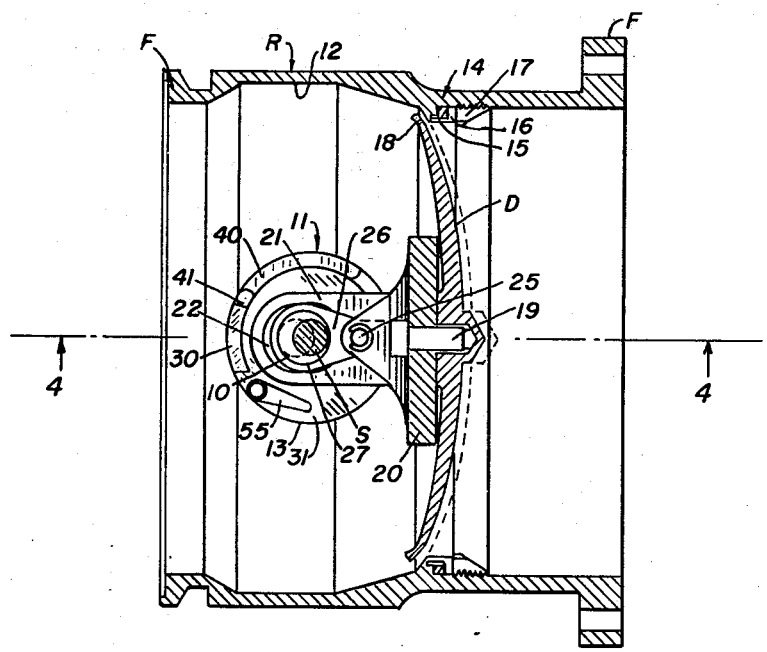
FIGURE 3 is a longitudinal sectional view similar to FIG. 2, but of the valve only and with the valve disc being swung to a flow-traversing position, and with the final seating position of the disc being shown in broken lines.
Figure 4:
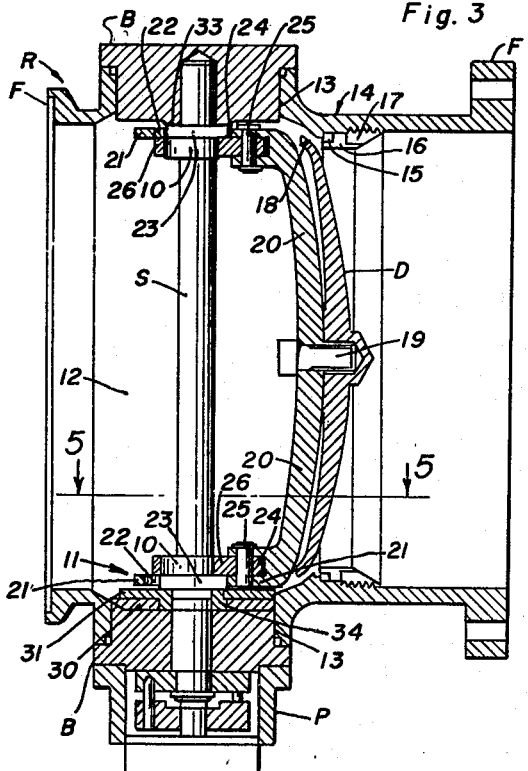
FIGURE 4 is a longitudinal sectional view as taken from the indicated line 4—4 at FIG. 3, with the disc being in a flow-traversing position and not seated.

Referring more particularly to the drawing, the improved butterfly valve is housed in a ring-shaped body R formed as a short cylindrical segment sized to fit sections of a conduit C as illustrated at FIG. 2, the body having suitable flanges F at each end for connection with like flanges on the conduit. The basic conventional components of this valve include a control shaft S which diametrically traverses its body to extend through bearings B at each side thereof. The shaft carries a closure disc D, which swings, by rotation of the shaft, from an open position parallel to the axis of the valve, FIG. 2, conduit to a closed position traversing the conduit, FIG. 3. The shaft may be operated manually or it may preferably include a power control P at one side thereof. The power unit, if used, may be a conventional unit which need not be described herein except to note that it rotates the shaft through an arc of 270 degrees for a complete opening or closing cycle of the valve disc.

In the present invention, the disc D is offset from the control shaft to swing, by rotation of the shaft, to one side of the passageway when the valve is open. It also swings, from the open position toward closure, first to a conduit-traversing position which is spaced from final closure upon a seat. It then shifts, from the conduit-traversing position to the final seating position by further rotation of the shaft. This compound swinging and shifting movement is accomplished by a control cam 10 on the shaft S and a mechanical interlock 11 interassociated with the shaft, the valve body and the closure disc. The advantage of the compound movement with the side-offset disc, will reside, first, in that a desirable torque pattern on the shaft is obtained in opening and closing the valve. In swinging the valve disc from the open to the flow-traversing position, with the flow in the direction of the indicated arrow *a* at FIG. 2, the force to turn the shaft is not excessive, and will diminish at an intermediate position such as 45 degrees and again at the aforestated conduit-traversing position and always the force will act against the closing movement. This eliminates an undesirable slam-shut action characteristic of ordinary types of butterfly valves. The compound movement also permits the valve disc D to swing clear of the valve body seat when opening and closing, and once in the conduit-traversing position, the disc will move slowly to the final seating position by rotation of the shaft S. This final seating movement can be utilized to minimize water hammer effects in the conduit.

The ring body R, a short cylindrical section, includes a diametrical enlargement 12 in which portion the valve shaft S is located, the enlargement being sufficient to provide clearance for the disc as it swings from the open to closed positions. This shaft S is mounted in the bearings B which, in turn, are mounted in diametrically opposing openings 13 at the enlargement of the body ring R. A ring seat 14 extends about the interior of the valve wall adjacent to one edge of the enlargement 12. This seat 14 includes a contact ring 15, preferably of a resilient material, a retainer ring 16 to hold the contact ring, and a lock ring 17 to secure the assembly in place. The lock ring is held in an internally threaded portion of the body R as shown. The face of this seat is inclined at 45 degrees or a like angle to effect a smooth continuous seating contact with the peripheral edge 18 of the closure disc D inclined in a similar manner.

The circular closure disc D is dished to provide structural rigidity and its peripheral seating edge 18 is thus inclined to mate with the seat 14 as aforestated. This disc is mounted upon an axial post 19 which, in turn, upstands from the center of a yoke 20 arched to conform with the disc contour, and diametrically bridge the shaft S. The legs 21 of this yoke, short rugged members, connect with the shaft S at each side of the valve interior and each includes a slot-like, oval opening 22 through which the shaft extends, each portion of the shaft adjacent to bearings B, being formed with a concentric circular head 23 fitting the slot opening 22 to permit the yoke and disc to move towards and away from the shaft during the seating operation.

A slot 24 traverses the yoke and is formed at the underside of the downturned portion of the yoke adjacent to the inner side of each leg 21. A pin 25, paralleling the shaft S is carried in holes 25 in the yoke 20 and leg portions 21 to extend across the slot 24 to hold a connector link 26 which, in turn, extends to and connects with the circular cam 10 on the shaft S, the connector link including a circular opening 27 which fits the cam. In operation, it follows that whenever the yoke and disc are restrained from swinging with rotation of the shaft S, as necessary when the disc moves from the conduit traversing position to a seating position, the rotation of the shaft will rotate the cams 10 to effect a shifting movement of the yoke 20 towards and away from the valve seat.

The interlock 11, which controls and programs the swinging and shifting movement of the valve closure disc D includes a pair of flat circular plates, a swing plate 30 and a shift plate 31 which lie together on the shaft S with the swing plate 30 lying against the inner face 32 of a bearing B. The bearing B is formed as a comparatively large-diameter member to provide an adequate surface for this face 32. In this arrangement the interlock plates 30 and 31 on the shaft S lie between the bearing B and a concentric head 23 which holds a yoke leg 21. In the drawing only one interlock is shown and a spacer 33 is placed against the other bearing to keep the yoke 20 centrally positioned upon the shaft. However, an interlock may be provided at each side of the shaft if desired, provided, of course, that the pair operate in unison.

The shift plate 31 is formed with a central hub 34 whose passageway includes a key slot 35 for direct connection upon the shaft S by a key 36. This hub 34 extends to the bearing face 32 and carries the swing plate 30 which may rotate about shaft S on the hub.

The rotation of the swing plate is through a 90-degree arc to swing the valve disc D from an open to a conduit-traversing position. To effect a positive limitation to this movement, an inscribed arcuate segment 40 is formed at the periphery of this plate 30 the ends of which contact a stop 41 which outstands from the inner face 32 of the bearing B. The reach of the segment is such that when the stop 41 is abutted against each end of the segment by rotation of the plate from one limiting position to the other, such rotation will be through a 90-degree arc. This swing plate 30 is connected to the yoke 20 by a finger 42 adjacent to the peripheral edge of the plate which outstands from its inner face to extend through an arcuate segment portion 43 in the shift plate 31, hereinafter described, and into a slot 44 in the adjacent leg 21 of the yoke 20. The finger 42 and the slot 44 are arranged to permit the yoke to shift outwardly from the shaft S but to inhibit swinging thereof whenever the swing plate is immobilized as by movement against the stop 41. As a matter of convenience the finger and slot may be offset with respect to the axis of the yoke leg to provide clearance for the oval opening 22 as in the manner illustrated.

The shift plate 31, affixed to the shaft S, includes the segment 43 inscribed in its peripheral edge to provide for clearance for the finger 42. The reach of the segment 43 is such that when the finger is abutted the opposite ends of the segment, by rotation of the plate from one limiting position to the other, such rotation will be through a 180-degree arc. It follows that the rotation of the shaft S to rotate both plates to the full extent of both arcuate segments 40 and 43 is 270 degrees to move the valve from a fully open to a closed position as now described.

A lock-release means is formed between the two plates 30 and 31 by providing a hole 50 in the swing plate adapted to receive a hardened ball 51. The hole and ball have a diameter slightly less than twice the thickness of the plate. A socket 52, sized to received the ball 51 is formed in the face of the bearing B to receive a portion of the ball 51 when the hole 50 and socket 52 are in registration the ball may move into the hole and socket to lock the plate to the bearing together. An ejection spring 53 is mounted in this socket 52 to normally urge the ball outwardly from the socket and into the hole 50. The shift plate 31 is formed with a sloping, cup-shaped socket 54, sized to receive the ball 51 and proportioned such that the ball may move approximately half way into the socket 54 when the socket 54 and hole 50 are in registration. The finger of a leaf spring 55, affixed to the face of the shift plate as by a pin 56 extends into the socket 54 to urge the ball outwardly from the socket 54 and into the hole 50. When the hole 50 is in registration with both the sockets 52 and 54, the springs 53 and 55 act against each other to bias the ball 51 at a central position in the hole 50 whereby a common movement of the plates both with respect to the bearing B, will snap the ball in the socket 54 to lock the plates together, while a movement of the shift plate 31 with respect to the swing plate 30 will snap the ball into the socket 52 to lock the swing plate to the bearing face.

Figure 5:
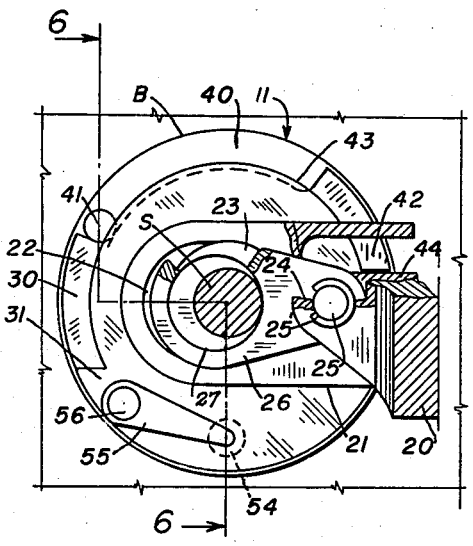
FIGURE 5 is a sectional view of the disc control mechanism as taken from the indicated line 5—5 at FIG. 4, but on an enlarged scale, and with certain portions of the mechanism being broken away to illustrate components otherwise hidden from view.
Figure 9:
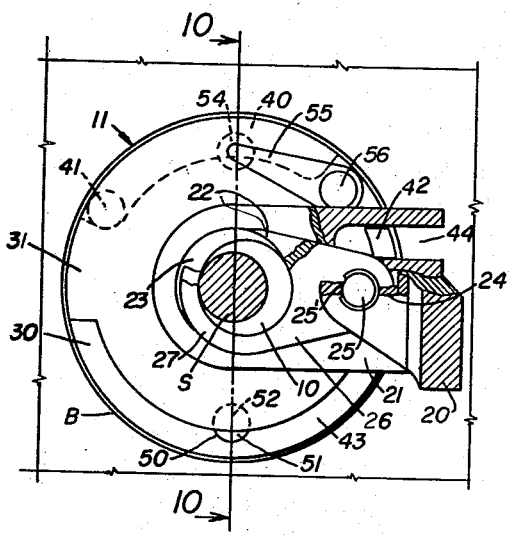
FIGURE 9 is a sectional detail similar to FIG. 5, but with the control shaft rotated to seat the valve.

The hole 50 in the swing plate, the socket 52 in the bearing, and the socket 54 in the shift plate are so positioned that when the disc D is swung to its transverse but unseated position, the three will be in a common alignment as in the manner illustrated in FIG. 5. A counter-clockwise rotation of the shaft from the position illustrated at FIG. 5 will force the ball out of the socket 52, the plates 30 and 31 will lock together, and the valve will swing open. A clockwise rotation of the shaft from the position illustrated in FIG. 5 will force the ball out of the socket 54 and into the socket 52, locking the swing plate to the bearing to effect a seating of the valve.

Figure 1:
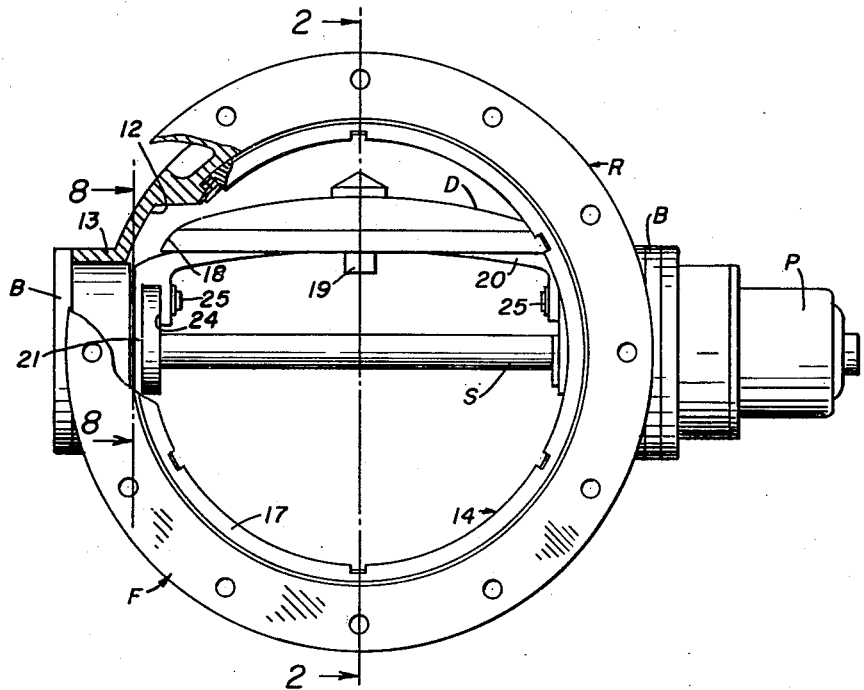
FIGURE 1 is an end view of a preferred construction of the valve with the closure disc being swung to the open position and with portions of the valve body being broken away to show constructions otherwise hidden from view.
Figure 11:
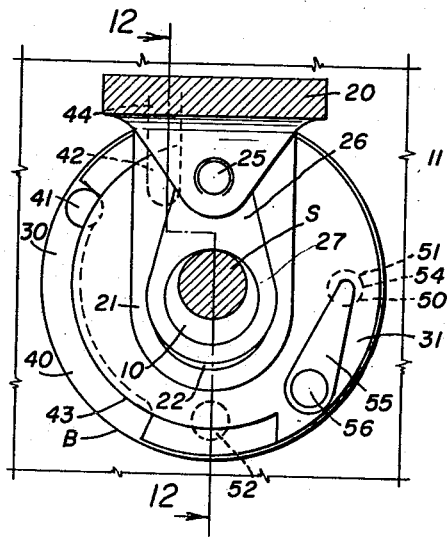
FIGURE 11 is a fragmentary sectional detail similar to FIG. 5 but with the control shaft rotated to open the valve.
Figure 10:
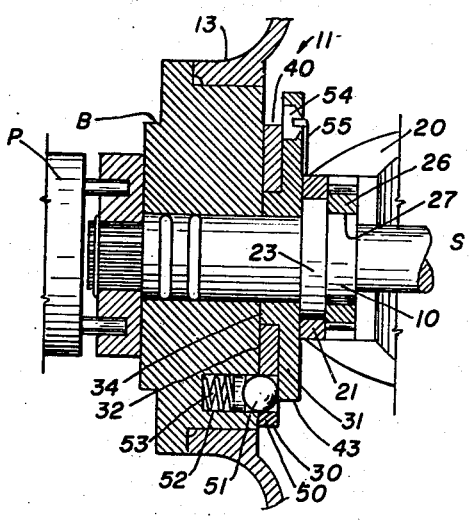
FIGURE 10 is a sectional detail as taken from the indicated line 10—10 at FIG. 9.
Figure 12:
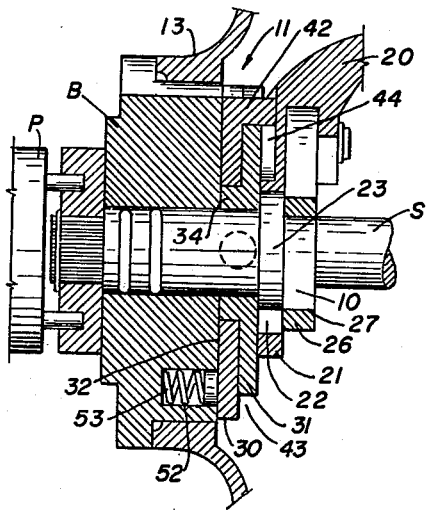
FIGURE 12 is a fragmentary sectional detail as taken from the indicated line 12—12 at FIG. 11.

The operation of the valve may now be described. Commencing with the open position of the disc D, as at FIGS. 1 and 2, the yoke legs are transverse to the valve axis. The cam 10 is rotated to place the disc at a position closest to the shaft, the plates 30 and 31 are at the full extent of their counterclockwise rotation with the arc segment 40 of the swing plate 30 abutting against the stop 41 and with the arc segment 43 of the shift plate abutting against the finger 42. The ball 51 is in the swing plate hole 50 and shift plate socket 54 to lock the plates together in FIGS. 11 and 12.

Clockwise rotation of the shaft S through a 90-degree arc swings the plates and disc to the flow-traversing but unseaetd position where the opposite end of the arc segment 40 abuts against stop 41 and the plates 30 and 31 are shifted to alignment with the bearing socket 52.

Continued clockwise rotation of the shaft shifts the ball from socket 54 to the socket 52 to lock the swing plate to the bearing and prevent any back swing of the disc which the shift plate is now disconnected from the swing plate 31, which continues to rotate. The continued rotation of the shaft is through a 180-degree arc, when the segment 43 contacts the opposite side of the finger 42. Such rotation reverses the position of the cam 10 to extend the yoke 20 and disc D away from the shaft, seat the disc to complete the closing cycle of operation. The opening cycles are the opposite, a 180-degree counterclockwise shaft rotation to unseat the disc and a 90-degree rotation to swing the disc to the full open position.

This compound sequential shaft rotation to swing the disc as from an open to a closed position minimizes the torque force upon the shaft S. FIG. 14 is a representative diagram of shaft torque versus shaft rotation as from the fully seated to the open position of the valve disc. As opening commences, this torque will be substantially uniform until the shaft is rotated 270 degrees, the flow-traversing position, where the shaft torque will be zero. Thence the torque builds up to the maximum at the fully open position. In reversing and closing, the actual force required to push the disc to a final seated position is large, however, the rotation through a 180-degree arc required to effect such pushing produces a great mechanical advantage and the actual shaft torque is not great.

I have now described my invention in considerable detail. However, it is obvious that others skilled in the art can build alternative and equivalent constructions which are nevertheless within the scope and spirit of my invention; hence, I desire that my protection be limited, not by the constructions so illustrated and described, but only by the proper scope of the appended claims.

I claim:

1. In a compound movement butterfly valve having a ring-shaped body with a circular seat therein and a shaft diametrically traversing the body at one side of the seat, a short-legged yoke mounted upon and bridging the shaft and a circular closure disc carried upon the yoke, said yoke and disc being adapted to swing with rotation of the shaft responsive to a swinging cycle of rotation of the shaft, from an open position with the disc at one side of the shaft paralleling the valve axis to a flow-traversing position with the disc being transverse to the flow axis and adjacent to the seat, the improvement comprising a shifting means adapted to prevent further swinging of the yoke and disc and to shift the disc from the said flow-traversing position to a seating position of the disc against the seat responsive to continued rotation of the shaft through a shifting cycle of rotation, said shifting means includes a pair of cams on the shaft, each connecting with a leg of the yoke, and being adapted to shift the yoke away from and towards the shaft when the shaft rotates through the shifting cycle and an interlock means adapted to engage the yoke with the shaft during said swinging cycle of the shaft rotation to immobilize the cam with respect to the yoke and at the termination of the said swinging cycle to disengage the yoke from the shaft and slidably engage the yoke to the valve body during said shifting cycle of shaft rotation, said interlock means includes a pair of plates mounted upon an end of the shaft against a side of the valve body with one plate being connected to the shaft and with the other plate being slidably connected to the yoke and a means associated with the yoke-connected-plate to alternatively lock it to the said shaft-connected-plate during said swinging cycle of shaft rotation and to release it from the said shaft-connected-plate and lock it to the body of the valve during said shifting cycle of shaft rotation.

2. In the organization set forth in claim 1 wherein said shifting means includes a cam on the shaft and a link connecting the cam and the yoke, and being adapted to shift the disc and yoke away from and toward the shaft when the shaft rotates through the said shifting cycle.

3. In the organization set forth in claim 1 wherein said swinging cycle requires a shaft rotation of substantially 90 degrees and wherein said shifting cycle requires a shaft rotation of substantially 180 degrees.

4. In the organization set forth in claim 1 wherein said shifting means includes a slotted opening in each yoke leg through which the shaft passes, a cam on the shaft adjacent to each yoke leg and a connecting rod on each cam extending to and pivotedly connecting with a yoke leg whereby to permit the yoke to shift back and forth on the shaft when the shaft rotates with respect to the yoke.

5. In the organization set forth in claim 1 wherein the connection of the said second plate with the yoke includes a finger outstanding from a side of the plate and extending into a slot in the yoke which parallels the axis of the yoke to thereby prevent the yoke from rotating with respect to the said second plate but to permit it to shift away from and towards the shaft carrying the yoke.

6. In the organization set forth in claim 1 wherein the interlock means include a pair of flat plates mounted upon the shaft against the valve body, a stub upstanding from the valve body adjacent to the shaft and extending into an arcuate cut-out in the first plate adjacent thereto, the cut-out being through an arc sufficient to limit the rotation of this first plate with respect to the valve body to that required for said swinging cycle, a finger outstanding from the first plate and extending into an arcuate cut-out in the second plate adjacent to the first, this arcuate cut-out being adapted to limit the rotation of the second plate with respect to the first to that required for said shifting cycle, said finger extending beyond the arcuate cut-out in the second plate and into a slot in the adjacent yoke leg directed to permit shifting of the yoke along its axis radically of the said shaft, and a means between the plates adapted to lock the plates together when the shaft is rotating through said swinging cycle but to disengage the plates when the shaft is rotating through said shifting cycle.

7. In the organization set forth in claim 6 wherein said locking means include a hole through the first plate, a socket in the valve body adjacent to the plate adapted to register with the hole when the shaft and plates thereon are rotated to the disc traversing position and a socket in the other plate adapted also to register with the hole at the disc traversing position, said hole being of a diameter greater than, and approximately twice the thickness of the first-mentioned plate, a ball in the hole adapted to be biased to a position centrally of the first-mentioned plate when the plates and shaft are rotated to said valve traversing position with the sockets at both sides of the plate being in registration with the hole, whereby when the shaft rotates to swing the disc from a traversing position to an open position the ball is forced out of the body socket and into the plate socket to lock the plates together and rotation of the shaft to shift the disc to a seating position and force the ball out of the plate socket and into the body socket to lock the first-mentioned plate to the body.

8. In the organization set forth in claim 7, a spring means in each socket adapted to urge the ball out of the socket with the spring means in the body socket being substantially balanced by the spring means in the outer plate socket to center of the ball substantially in the hole of the first-mentioned plate.

References Cited

UNITED STATES PATENTS

| | | | |
|---|---|---|---|
| 2,919,885 | 1/1960 | Daigle | 251—163 XR |
| 2,934,310 | 4/1960 | Kinney | 251—163 |
| 3,262,671 | 7/1966 | Muench | 251—163 |
| 3,180,362 | 4/1965 | Muller | 251—163 XR |

HAROLD W. WEAKLEY, Primary Examiner

U.S. Cl. X.R.

251—188, 308